A. D. LUFKINS,
Sewing Machine Treadle.

No. 116464

Patented Jun 27 1871

UNITED STATES PATENT OFFICE.

AMOS D. LUFKIN, OF CLEVELAND, OHIO.

IMPROVEMENT IN SEWING-MACHINE TREADLES.

Specification forming part of Letters Patent No. 116,464, dated June 27, 1871.

*To all whom it may concern:*

Be it known that I, AMOS D. LUFKIN, of Cleveland, Cuyahoga county, Ohio, have invented a new and useful Sewing-Machine Treadle, of which the following is a specification:

The nature of this invention relates to the combination of two connecting-rods, connecting each of the foot-rests with a rocking lever secured to the under side of the table, and also combining with one of the aforesaid rods a second shorter connecting-rod with the crank of a driving-wheel.

Figure 1:
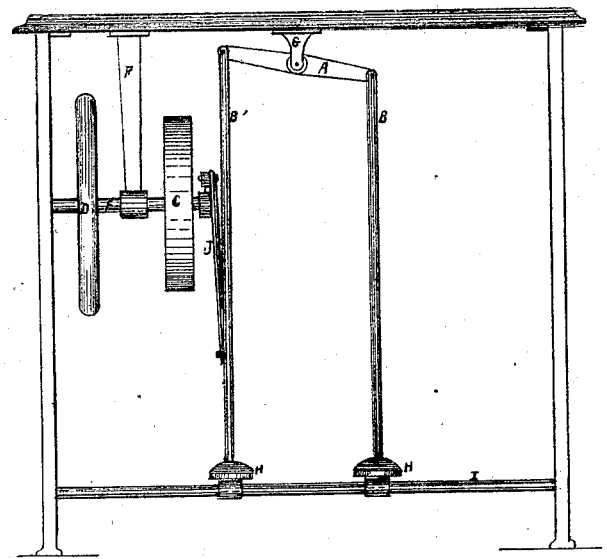
Figure 2:
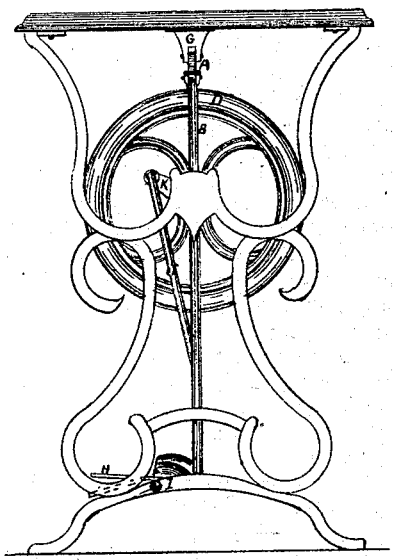
Figure 3:
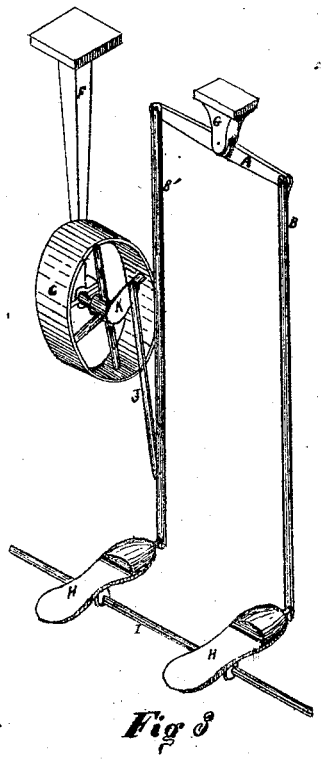

In the drawing, Figure 1 is a side elevation, and Fig. 2 is an end elevation of a sewing-machine table embodying my invention. Fig. 3 is a detached perspective view of my improved treadle, showing its connection with the driving-wheel.

A is a rocking lever, suspended at its center to a bracket, G, which is secured to the under side of a table-top. H H are foot-rests, of the ordinary construction, attached to a cross-rod, I, of the table. To the toes of each of the foot-rests are attached, by a suitable joint, rods B B, connecting them to the ends of the rocking lever A. The foot-rests have an alternate motion, and thus impart a corresponding motion to the rocking lever A. To the connecting-rod B' is attached, by a pin, a shorter rod, J, connecting it with the crank K of the driving-pulley C. The connecting-rod is equal in length to the circumference of the circle described by the crank K. The rod B is made heavier than the other by being loaded or otherwise, so as to make it balance with the rod J and crank K, whereby the feet of the operator exert an equal force, and, by having an alternate motion, assist one another.

The advantages of this mode of construction are derived from the equal distribution of the motive power, giving an alternate movement to the feet, allowing them to have their natural movement at the ankle-joint, making the application of the power easy and natural, like the walking motion, without exertion to the body.

I claim as my invention—

The combination of the rocking lever A, the connecting-rods B B', the connecting-rod J, and the foot-treadles H H, substantially as and for the purpose set forth.

A. D. LUFKIN.

Witnesses:
 GEO. A. KOLBE,
 CHAS. A. STIBLE.